United States Patent
Okamoto (10) Patent No.: US 9,438,752 B1
(45) Date of Patent: Sep. 6, 2016

(54) IMAGE READING DEVICE AND IMAGE FORMING APPARATUS FOR DETECTING DIRT AT A DOCUMENT READING POSITION

(71) Applicant: KYOCERA Document Solutions Inc., Osaka (JP)

(72) Inventor: Katsuhiko Okamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/044,665

(22) Filed: Feb. 16, 2016

(30) Foreign Application Priority Data

Feb. 17, 2015 (JP) ................................ 2015-029010

(51) Int. Cl.
G06F 3/12 (2006.01)
H04N 1/00 (2006.01)
H04N 1/10 (2006.01)
H04N 1/04 (2006.01)

(52) U.S. Cl.
CPC ...... *H04N 1/00037* (2013.01); *H04N 1/00013* (2013.01); *H04N 1/0057* (2013.01); *H04N 1/00909* (2013.01); *H04N 1/1061* (2013.01); H04N 2201/0094 (2013.01)

(58) Field of Classification Search
CPC .............. H04N 1/00037; H04N 1/00013; H04N 1/00909; H04N 1/00803; H04N 1/0032; H04N 1/0057; H04N 1/0094; H04N 1/1061; H04N 2201/0094
USPC ............ 358/1.1, 1.12, 1.14, 1.15, 3.26, 461, 358/474, 491, 488
See application file for complete search history.

(56) References Cited

U.S. PATENT DOCUMENTS

| | | | |
|---|---|---|---|
| 6,750,990 B1* | 6/2004 | Ohashi | H04N 1/00002 358/471 |
| 8,305,655 B2* | 11/2012 | Harada | H04N 1/00092 358/406 |
| 2006/0124874 A1* | 6/2006 | Uto | G01N 21/9501 250/559.45 |
| 2007/0291324 A1* | 12/2007 | Kamei | H04N 1/00002 358/474 |
| 2010/0020369 A1* | 1/2010 | Harada | H04N 1/00092 358/475 |
| 2010/0315691 A1* | 12/2010 | Nishio | G03G 15/607 358/475 |
| 2014/0293371 A1* | 10/2014 | Kurokawa | H04N 1/042 358/475 |
| 2015/0022868 A1* | 1/2015 | Shimizu | H04N 1/125 358/475 |

FOREIGN PATENT DOCUMENTS

JP 2003-008847 A 1/2003

* cited by examiner

*Primary Examiner* — Gabriel Garcia (57) ABSTRACT

An image reading device includes: a document conveyance section configured to convey an original document placed on a document loading chute; an original glass plate allowing the document conveyed from the document conveyance section to pass thereover; a reading unit that includes a light-emitting part including first, second, and third light sources and configured to emit light toward the document at a predetermined document reading position and a light-receiving part configured to receive light reflected on the document; a housing including a hollow letting part of light from the light-emitting part out of the image reading device; a foreign matter detecting section configured to detect a foreign matter on the original glass plate; and an operation control section configured to control the operation of the light-emitting part and, upon detection of the foreign matter, allow the light-emitting part to emit light in a different color from when reading the document.

13 Claims, 8 Drawing Sheets

IMAGE READING DEVICE AND IMAGE FORMING APPARATUS FOR DETECTING DIRT AT A DOCUMENT READING POSITION

INCORPORATION BY REFERENCE

This application claims priority to Japanese Patent Application No. 2015-29010 filed on Feb. 17, 2015, the entire contents of which are incorporated by reference herein.

BACKGROUND

The present disclosure relates to image reading devices and image forming apparatuses with the same and particularly relates to a technique for, if there is dirt at a document reading position, notifying a user of the existence of dirt at the document reading position.

There is known a so-called sheet-through image reading device in which an original document being conveyed over a document reading position by a document conveyance section is read through an original glass plate placed at the document reading position by a reading unit, such as a scanner. If in this image reading device there is dirt, such as dust, on the original glass plate, the dirt naturally appears as a stripe in a read image from the reading unit, resulting in an abnormal image. To cope with this, for example, a technique is disclosed in which when in an image reading device dirt, such as dust, on an original glass plate is detected, the image reading device notifies a user of the existence of dirt, such as dust, on the original glass plate by producing a peep or the like or lighting or blinking a dedicated LED (light emitting diode) or the like.

SUMMARY

A technique improved over the above technique is proposed herein as one aspect of the present disclosure.

An image reading device according to an aspect of the present disclosure includes a housing, a document conveyance section, an original glass plate, a reading unit, an operation control section, and a foreign matter detecting section.

The housing forms an outer covering of the image reading device.

The document conveyance section includes a document loading chute and is configured to convey an original document placed on the document loading chute.

The original glass plate allows the original document being conveyed from the document conveyance section to pass thereover.

The reading unit includes: a light-emitting part including first light source, second light source, and third light source and configured to emit light to the original document at a predetermined document reading position; and a light-receiving part configured to receive light reflected on the original document.

The operation control section is configured to control a light emitting operation of the light-emitting part.

The foreign matter detecting section is configured to detect a foreign matter on the original glass plate.

The housing is provided with a hollow capable of letting part of the light emitted from the light-emitting part out of the image reading device.

The operation control section is further configured to, when the foreign matter detecting section detects the foreign matter on the original glass plate, allow the light-emitting part to emit light of a different color from the light emitted during reading of the original document.

An image forming apparatus according to another aspect of the present disclosure includes the above-described image reading device and an image forming section.

The image forming section is configured to form an image on a recording paper sheet based on image data read by the image reading device.

DETAILED DESCRIPTION

Figure 1:
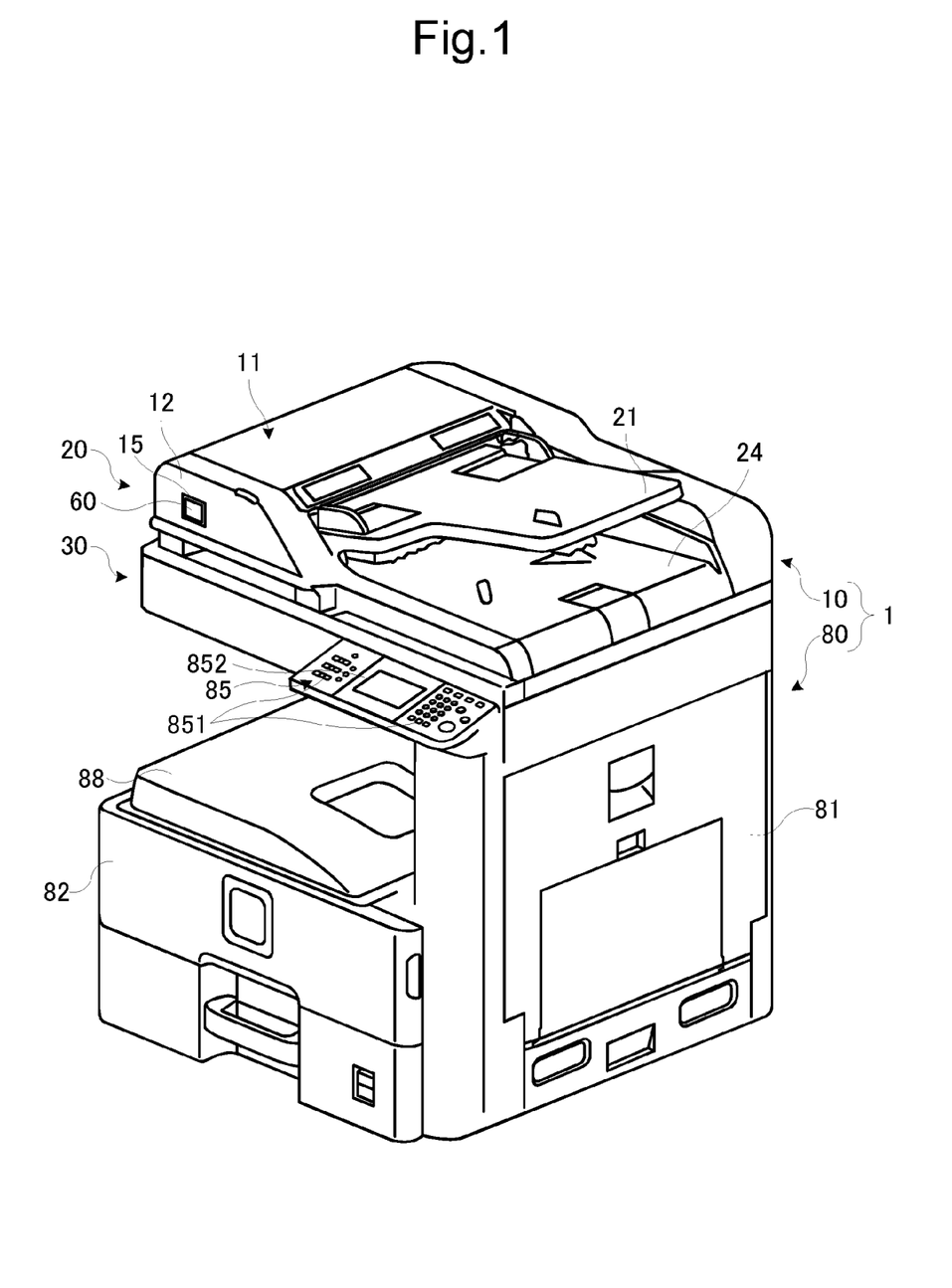
FIG. 1 is a perspective view showing an image forming apparatus according to one embodiment of the present disclosure.
Figure 2:
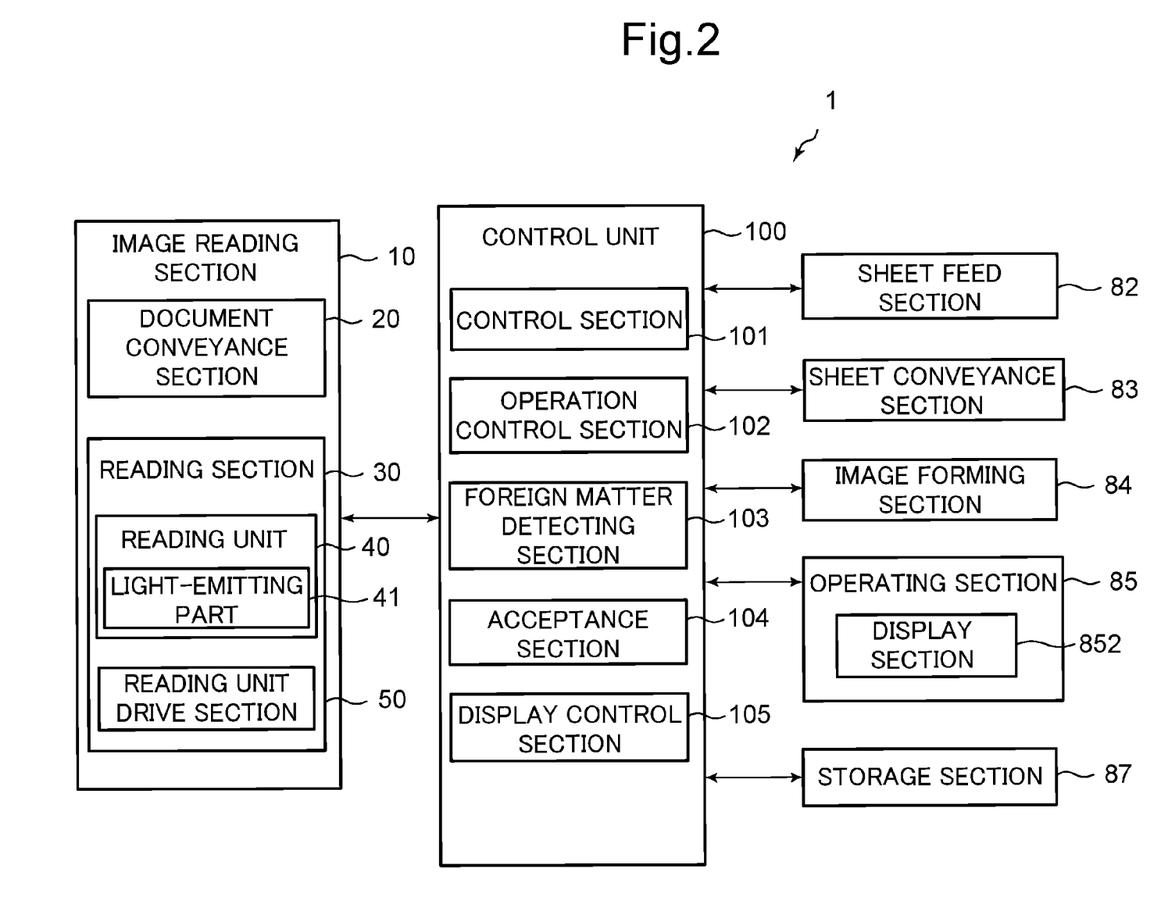
FIG. 2 is a block diagram showing an internal configuration of the image forming apparatus according to the one embodiment of the present disclosure.

Hereinafter, a description will be given of an image reading device according to one embodiment of the present disclosure and an image forming apparatus with the same, with reference to the drawings. FIG. 1 is a perspective view showing the image forming apparatus with the image reading device according to the one embodiment of the present disclosure. FIG. 2 is a block diagram showing an internal configuration of the image forming apparatus with the image reading device according to the one embodiment of the present disclosure.

The image forming apparatus 1 is a multifunction peripheral having multiple functions, including a facsimile communication function, a copy function, a print function, and a scan function. As shown in FIG. 1, the image forming apparatus 1 is roughly composed of an apparatus body 80 and an image reading section 10 disposed over the apparatus body 80.

A housing 81 constituting an outer covering of the apparatus body 80 accommodates a sheet feed section 82, a sheet conveyance section 83, an image forming section 84, a storage section 87, and so on.

The sheet feed section 82 includes a sheet feed cassette (not shown) capable of accommodating a plurality of sheets (recording paper sheets) and a feed roller (not shown) configured to feed the recording paper sheets accommodated in the sheet feed cassette to a sheet conveyance path provided in the interior of the housing 81.

The sheet conveyance section 83 includes a plurality of conveyance roller pairs (not shown) provided at the respective plurality of locations along the sheet conveyance path and a drive section (not shown) operable to drive the conveyance roller pairs into rotation and is configured to convey a sheet fed from the sheet feed section 82 toward the image forming section 84.

The image forming section 84 includes a photosensitive drum (not shown), a charging device (not shown), an exposure device (not shown), a developing device (not shown), and so on and is configured to form a toner image of an original document read by the image reading section 10 on the photosensitive drum through charging, exposure, and development processes. The toner image formed on the photosensitive drum is transferred to the sheet conveyed by the sheet conveyance section 83 and the sheet is subjected to fixation processing and then discharged to a sheet output tray 88.

An operating section 85 is disposed at the front of the housing 81 of the apparatus body 80. The operating section 85 includes a plurality of operating keys 851, such as a start key for use in instructing an execution of an image reading job (image reading instruction), and a display section 852 formed by including a liquid crystal display (LCD) or an organic light-emitting diode (OLED) display.

Figure 3:
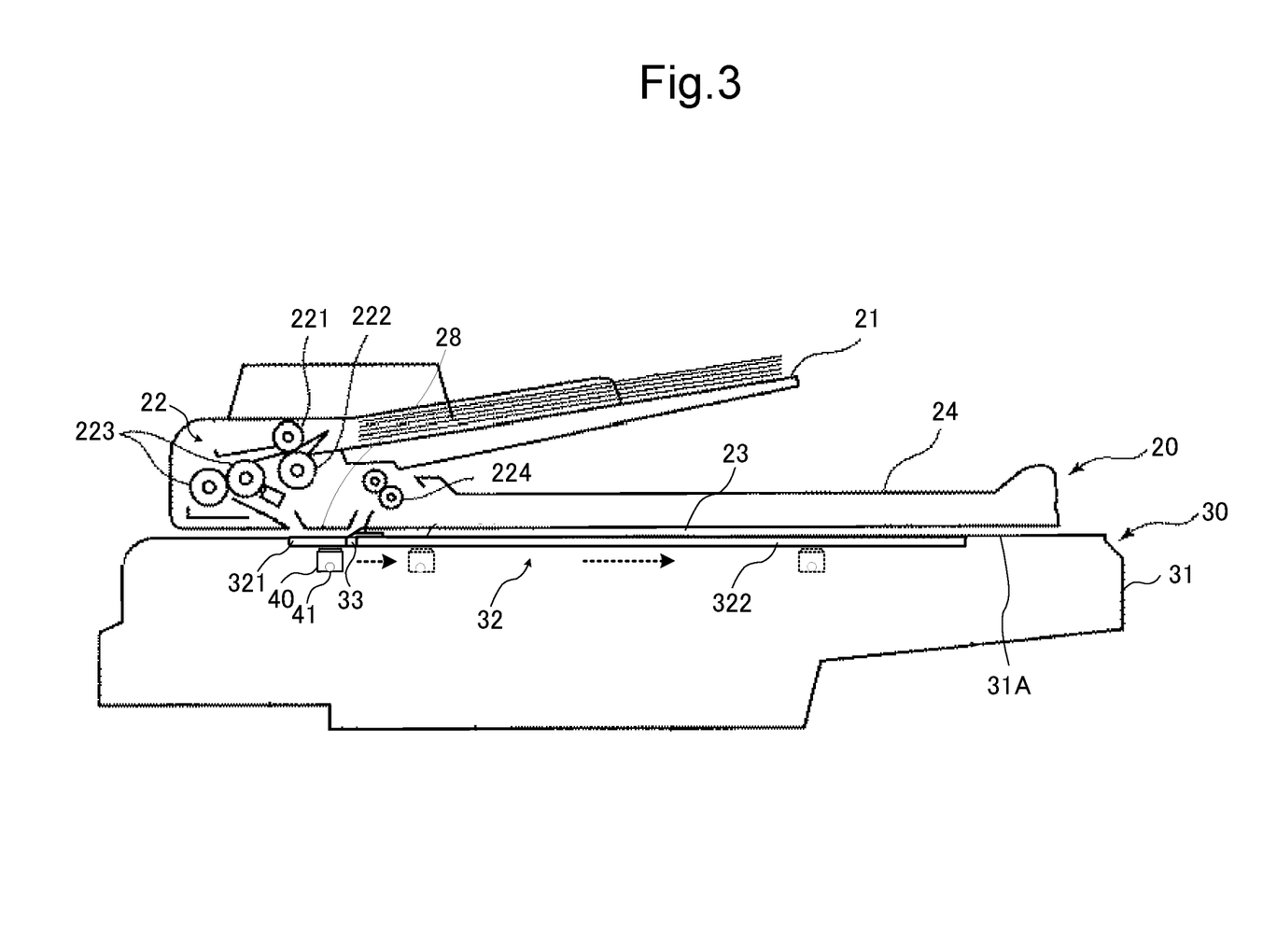
FIG. 3 is a cross-sectional view showing the structure of an image reading section in the one embodiment of the present disclosure.
Figure 4:
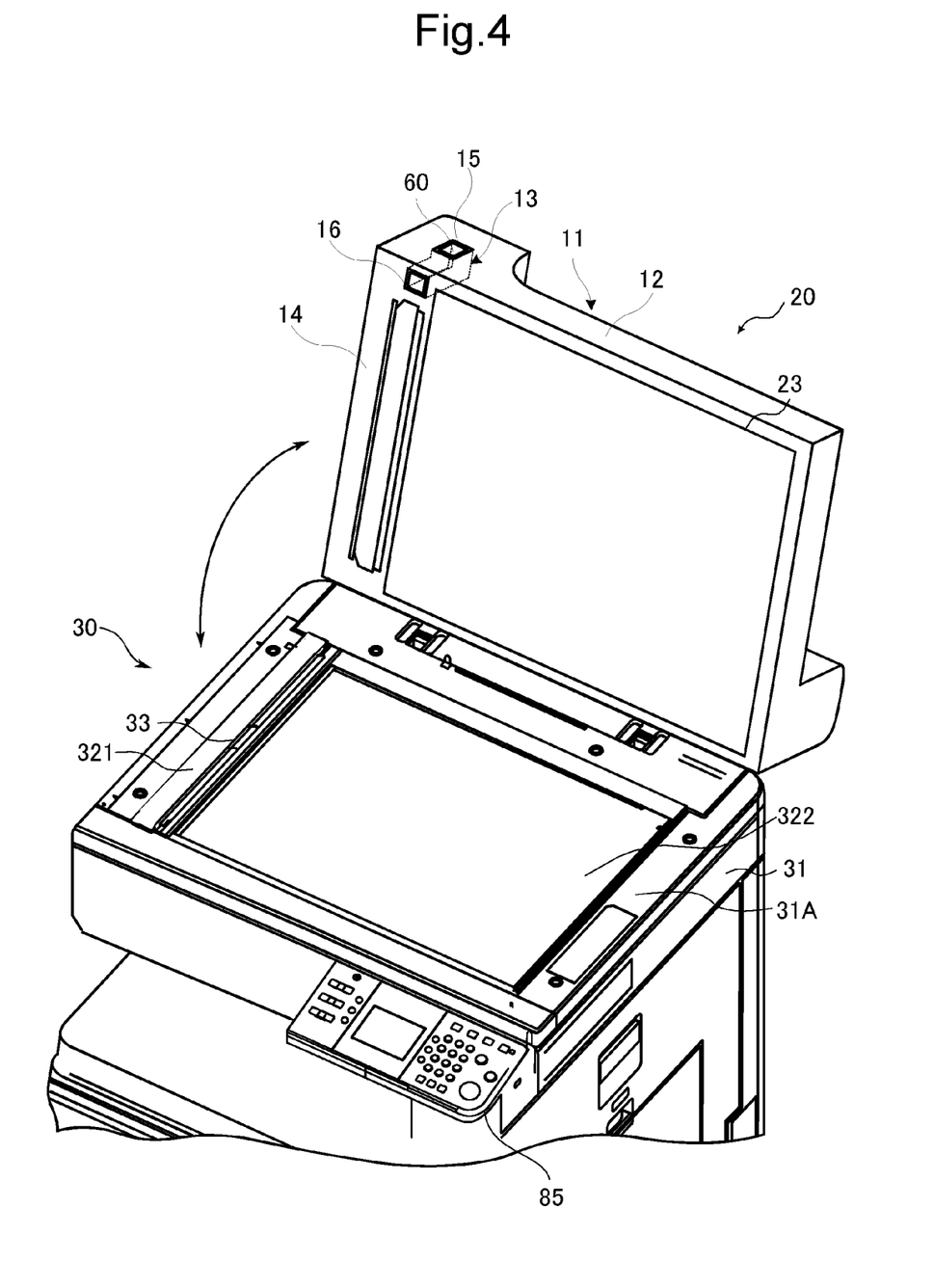
FIG. 4 is a perspective view showing the image reading section when a document conveyance section is open in the one embodiment of the present disclosure.

FIG. 3 is a cross-sectional view showing the structure of the image reading section 10 in the one embodiment of the present disclosure. FIG. 4 is a perspective view showing the image reading section 10 when a document conveyance section 20 is open in the one embodiment of the present disclosure.

The image reading section 10 includes a reading section 30 and a document conveyance section 20 disposed over the reading section 30.

The document conveyance section 20 includes a document loading chute 21 on which a plurality of original documents can be placed, a document conveyance mechanism 22 operable to convey the original documents placed on the document loading chute 21, a platen mat 23, and a document ejection portion 24 onto which already read original documents are to be ejected. The document conveyance mechanism 22 is configured to feed forward the plurality of original documents placed on the document loading chute 21 sheet by sheet by a sheet feed roller 221 and a separation roller 222 arranged in pair and convey the fed original document toward a below-described original glass plate 32 by a conveyance roller pair 223. The original document conveyed onto the original glass plate 32 is read by a below-described reading unit 40 at a document reading position located between a white guide member 28 and the original glass plate 32. The document conveyance mechanism 22 is further configured to eject the already read original document to the document ejection portion 24 by a sheet ejection roller 224.

Furthermore, the document conveyance section 20 is provided to be openable and closable with respect to the main surface of the original glass plate 32 and thus serves as an original cover capable of holding an original document placed on the original glass plate 32.

An opening is provided in a surface 31A of the housing 31 of the reading section 30 facing the document conveyance section 20 when the document conveyance section 20 serving as the original cover is closed. An original glass plate 32 is fitted into the opening. The original glass plate 32 is divided into a first original glass plate 321 for use in reading an original document being conveyed and a second original glass plate 322 for use in reading a stationary original document. A document separating member 33 is provided between the first and second original glass plates 321 and 322 in order to separate the original document read by the reading unit 40 from the first original glass plate 321 and eject it.

The reading unit 40 is provided movably in the sub-scanning direction beside a surface (back surface) of the original glass plate 32 opposite to a surface (front surface) thereof on which an original document is to be placed. In reading a stationary original document, the reading unit 40 reads the original document placed on the second original glass plate 322 while being reciprocated in the sub-scanning direction by a reading unit drive section 50 (see FIG. 2) formed of a motor, a gear, and so on. On the other hand, in reading an original document being conveyed, the reading unit 40 is kept fixed at a predetermined position on the back side of the first original glass plate 321 by the reading unit drive section 50 and reads, at the predetermined document reading position, the original document being conveyed over the first original glass plate 321 by the document conveyance section 20.

The reading unit 40 includes: a light-emitting part 41 composed of, for example, a plurality of LEDs including a red LED (the first light source), a green LED (the second light source), and a blue LED (the third light source); and an unshown light-receiving part, such as a CMOS (complementary metal oxide semiconductor) image sensor. The reading unit 40 is configured to apply red, green, and blue light beams from the light-emitting part 41 to an original document to be read while switching from one colored light beam to another and receive reflected light from the original document on the light-receiving part. The light-receiving part converts the received light into an electrical signal to acquire image data of one line in the main scanning direction. The image data is converted into a digital signal by an A/D converter built in the image forming apparatus 1 and then subjected to various image processing, such as shading correction, gamma correction, chromatic aberration correction, MTF (modulation transfer function) correction, and scanner color correction. Then, the image data generated by the above image processing is stored in a storage section 87, such as an image memory or an HDD, built in the image forming apparatus 1.

An opening 15 is formed in a front surface 12 of a housing 11 forming an outer covering of the image reading section 10. Likewise, an opening 16 is also formed in a bottom surface 14 of the housing 11 facing the reading section 30 when the document conveyance section 20 serving as the original cover is closed. These openings 15 and 16 are connected by an approximately L-shaped hollow 13.

The opening 16 is provided at a location of the bottom surface 14 near a stationary position of the reading unit 40 when kept fixed during reading of an original document being conveyed. Therefore, part of the light emitted from the light-emitting part 41 of the reading unit 40 during reading of the original document being conveyed enters the opening 16. The light entering the opening 16 passes through the hollow 13 and then exits the image forming apparatus 1 through the opening 15.

An approximately L-shaped light guide 60 is provided in the hollow 13. The light guide 60 guides the light entering the opening 16 to the opening 15. Furthermore, the exit surface of the light guide 60 through which light goes toward the outside of the image forming apparatus 1 is embossed. The light exiting the light guide 60 is diffused by the embossed pattern formed on the exit surface of the light guide 60.

Referring back to FIG. 2, the image forming apparatus 1 further includes a control unit 100. The control unit 100 is composed of a CPU (central processing unit), a RAM (random access memory), a ROM (read only memory), and so on. When a control program stored in the above ROM or storage section 87 is executed by the above CPU, the control unit 100 functions as a control section 101, an operation control section 102, a foreign matter detecting section 103, an acceptance section 104, and a display control section 105. Alternatively, each of the sections of the control unit 100 may not be implemented by the operation of the control unit 100 in accordance with the aforementioned control program but may be constituted by a hardware circuit.

The control section 101 governs the overall operation control of the image forming apparatus 1. The control section 101 is connected to the image reading section 10, the sheet feed section 82, the sheet conveyance section 83, the image forming section 84, the operating section 85, and so on and performs the operation control of the above sections connected thereto and signal or data transfer to and from the sections.

The acceptance section 104 has the function of accepting an instruction to execute an image reading job and other instructions entered using the operating keys 851 or the like of the operating section 85.

The display control section 105 has the function of controlling the display operation of the display section 852.

The operation control section 102 has the function of controlling an operation of the reading unit drive section 50 for driving the reading unit 40 and a light emitting operation of the light-emitting part 41.

The foreign matter detecting section 103 has the function of determining whether or not there is dirt (a foreign matter (FM)), such as dust, on the first original glass plate 321 for use in reading an original document being conveyed. The foreign matter detecting section 103 acquires image data for analysis by reading a white guide member 28 through the first original glass plate 321 with no original document placed on the first original glass plate 321. The foreign matter detecting section 103 determines whether or not there is a foreign matter on the first original glass plate 321 by analyzing the acquired image data for analysis. Specifically, when detecting a pixel having a pixel value not more than a predetermined threshold value, the foreign matter detecting section 103 determines that there is a foreign matter on the first original glass plate 321. When detecting no pixel having a pixel value not more than the predetermined threshold value, the foreign matter detecting section 103 determines that there is no foreign matter on the first original glass plate 321. The predetermined threshold value defines the sensitivity for detecting a foreign matter of determining whether or not there is a foreign matter, and is previously stored in the storage section 87 or the like. In performing the above foreign matter detection processing, the foreign matter detecting section 103 reads the predetermined threshold value from the storage section 87 or the like.

Thus far is the description of the structure of the image forming apparatus 1 according to the one embodiment of the present disclosure. The image reading device according to the one embodiment of the present disclosure has, as an example, a structure including the above-described image reading section 10, the above-described control unit 100, the above-described operating section 85, the above-described storage section 87, and so on.

Figure 5:
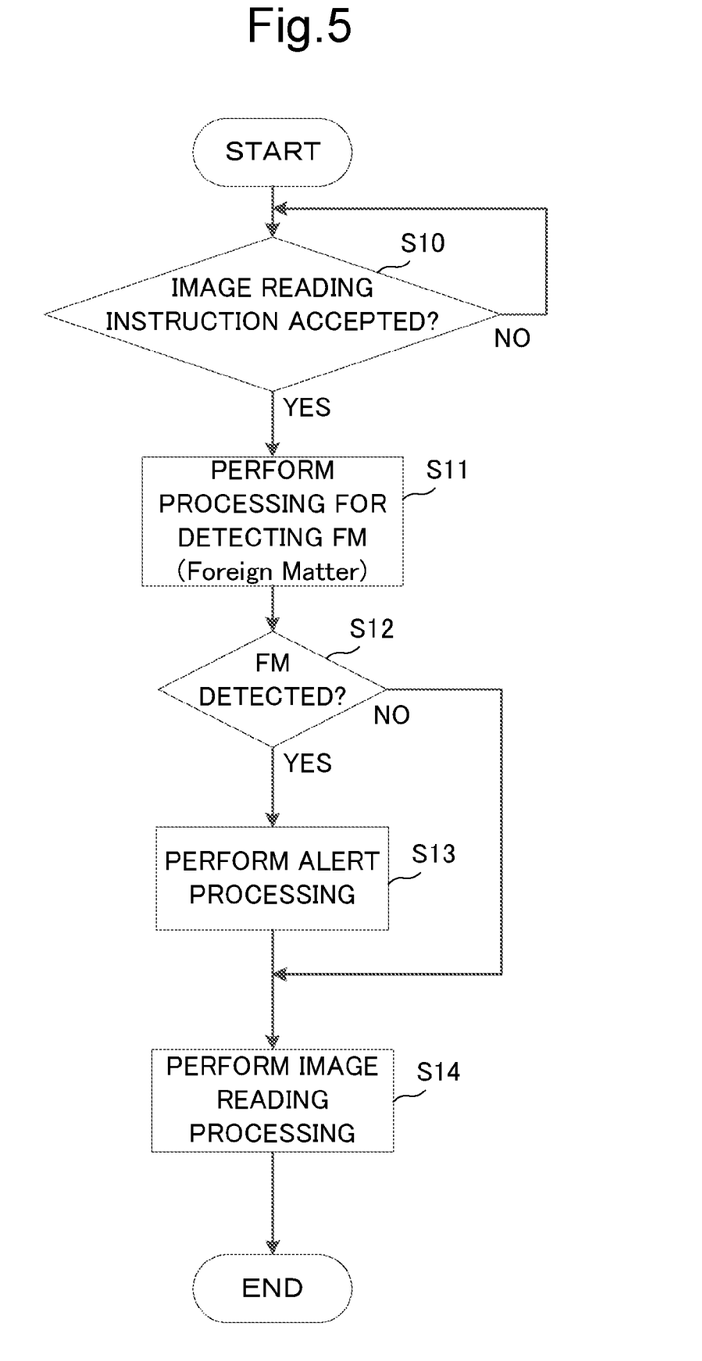
FIG. 5 is a flowchart showing a flow of an image reading operation of the image forming apparatus according to the one embodiment of the present disclosure.

Next, a description will be given of the operation of the image forming apparatus 1 according to the one embodiment of the present disclosure. FIG. 5 is a flowchart showing a flow of an image reading operation of the image forming apparatus 1 according to the one embodiment of the present disclosure.

When the acceptance section 104 accepts an image reading instruction (YES in step S10), the foreign matter detecting section 103 determines whether or not there is a foreign matter on the first original glass plate 321 for use in reading an original document being conveyed (step S11).

When the foreign matter detecting section 103 determines that there is a foreign matter on the first original glass plate 321 (YES in step S12), the operation control section 102 performs alert processing (step S13). In the alert processing, the operation control section 102 first allows the reading unit drive section 50 to move the reading unit 40 to the stationary position of the reading unit 40 to be kept fixed during reading of an original document being conveyed. Then, the operation control section 102 allows the light-emitting part 41 to emit light in a light emitting mode different from that of the light-emitting part 41 during reading of an original document (i.e., reading of an original document being conveyed or reading of a stationary original document).

The operation control section 102 allows the light-emitting part 41 to emit light in a different light emitting mode by changing the color of light to be emitted. During reading of an original document, the operation control section 102 allows the light-emitting part 41 to emit white light in which red, green, and blue light beams emitted from the red LED, the green LED, and the blue LED are superimposed. On the other hand, during the alert processing, the operation control section 102 allows the light-emitting part 41 to emit light of a color other than white, for example, red light by allowing only the red LED to emit light.

The operation control section 102 may allow the light-emitting part 41 to change the color of light emitted therefrom depending on the amount of foreign matter (the size thereof or the number of foreign matters) detected by the foreign matter detecting section 103. For example, when the foreign matter detecting section 103 detects at least a predetermined amount of foreign matter, the operation control section 102 allows the light-emitting part 41 to emit red light. When the foreign matter detecting section 103 detects less than the predetermined amount of foreign matter, the operation control section 102 emits yellow light.

Alternatively, the operation control section 102 may allow the light-emitting part 41 to emit light in different light emitting modes depending on the amount of foreign matter detected by the foreign matter detecting section 103 by allowing the light-emitting part 41 to light or blink. For example, when the foreign matter detecting section 103 detects at least a predetermined amount of foreign matter, the operation control section 102 allows the light-emitting part 41 to light red. When the foreign matter detecting section 103 detects less than the predetermined amount of foreign matter, the operation control section 102 allows the light-emitting part 41 to blink red.

Part of the light emitted from the light-emitting part 41 in the above alert processing enters the opening 16. The light entering the opening 16 passes through the hollow 13 and then exits the image forming apparatus 1 through the opening 15. Since the light exiting the opening 15 provided in the front surface 12 of the housing 11 forming the outer covering of the image reading section 10 has a different color from the light during reading of an original document, the user can know the existence of dirt, such as dust, on the first original glass plate 321 for use in reading an original document being conveyed. Furthermore, the alerting can be implemented, without the provision of any dedicated LED or the like, with a simple structure.

The above alert processing in step S13 is performed for a predetermined time. After the predetermined time has passed, the processing in step S13 ends and the operation control section 102 allows the document conveyance section 20 to convey an original document placed on the document loading chute 21 and allows the reading section 30 to read the original document at the document reading position (step S14).

On the other hand, when the foreign matter detecting section 103 determines that there is no foreign matter on the first original glass plate 321 (NO in step S12), the operation control section 102 performs the image reading processing in step S14 without performing the alert processing in step S13.

The description in the flowchart shown in FIG. 5 has been given of the case where the alert processing in step S13 is performed before the execution of the image reading processing. However, if there are a plurality of original documents to be read, the operation control section 102 may perform the alert processing during a sheet interval from the end of an operation of the reading section 30 for reading one original document to the start of an operation of the reading section 30 for reading the next one. In this case, light in the light emitting mode during reading of an original document (for example, white light) and light in the light emitting mode during the alert processing (for example, red light) are alternately emitted through the opening 15 to the outside of the image forming apparatus 1.

Furthermore, the operation control section 102 may perform the alert processing in step S13 after the end of the image reading processing in step S14, i.e., after the end of the reading of all the original documents indicated by the image reading instruction accepted in step S10.

The description in the flowchart shown in FIG. 5 has been given of the case where the foreign matter detecting section 103 performs the foreign matter detection processing before the execution of the image reading processing. However, if there are a plurality of original documents to be read, the foreign matter detecting section 103 may perform the foreign matter detection processing during a sheet interval from the end of an operation of the reading section 30 for reading one original document to the start of an operation of the reading section 30 for reading the next one.

For example, in the case where the user is notified of the existence of dirt, such as dust, on the original glass plate simply by producing a peep or the like, such an acoustic notification using a sound may offer a sense of discomfort to non-involved persons other than the user having entered the document reading instruction. Therefore, depending on the manner of using the image reading device, visual notification may be preferable to acoustic notification. In addition, since the technique applied to the image reading device as described in BACKGROUND is visual notification using a dedicated LED or the like, it is necessary to additionally provide a dedicated LED or the like for the image reading device.

Unlike the above conventional technique, if there is dirt, such as dust, on the original glass plate, the image forming apparatus 1 according to the above embodiment can notify the user of the existence of dirt with a simple structure.

The present disclosure is not limited to the above embodiment and can be modified in various ways.

<Modification 1>

Figure 6:
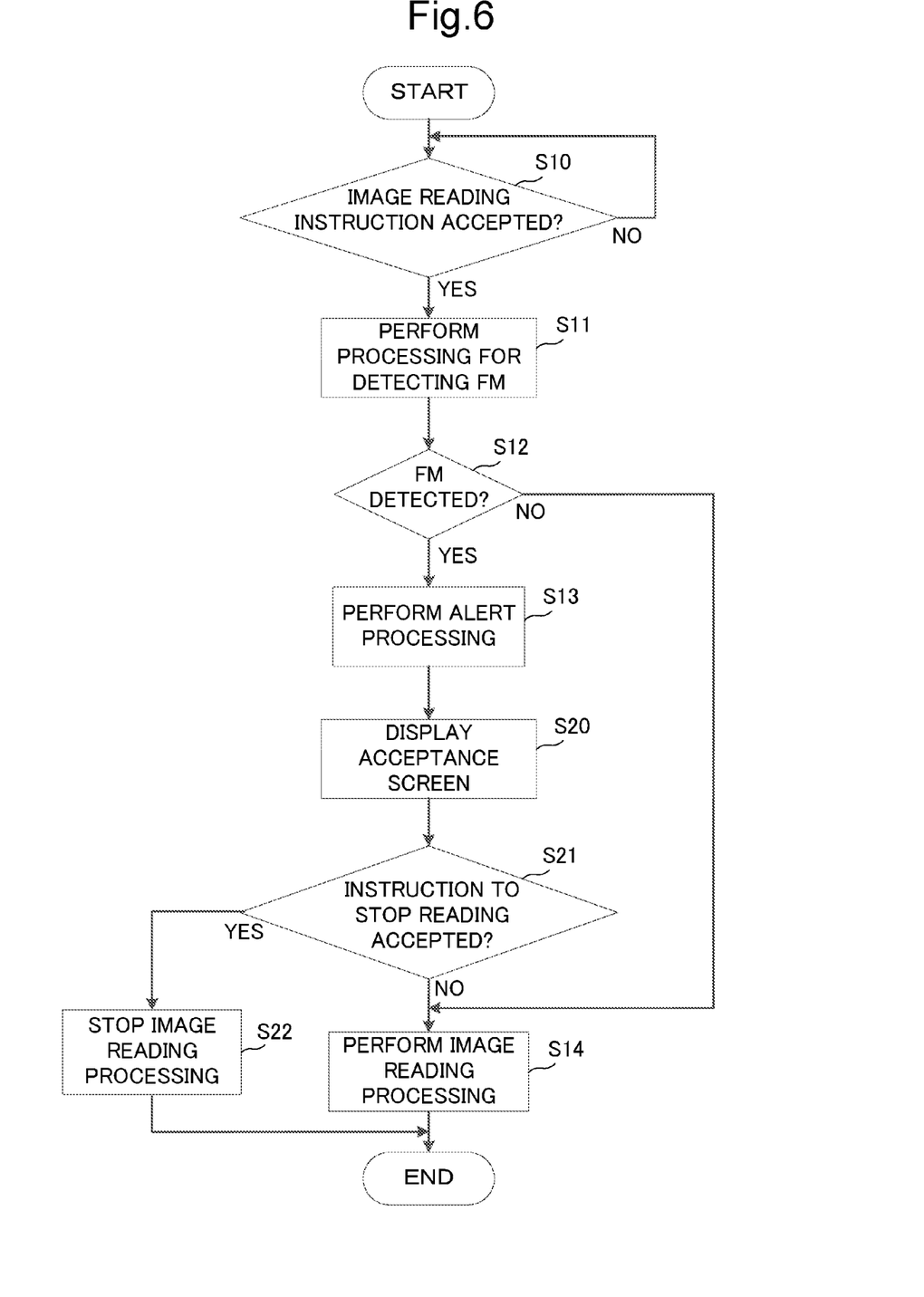
FIG. 6 is a flowchart showing a flow of an image reading operation of an image forming apparatus according to Modification 1 of the present disclosure.

FIG. 6 is a flowchart showing a flow of an image reading operation of an image forming apparatus according to Modification 1 of the present disclosure. The same processing steps as those in the flowchart shown in FIG. 5 will be designated by the same references and further explanation thereof will be omitted.

Figure 7:
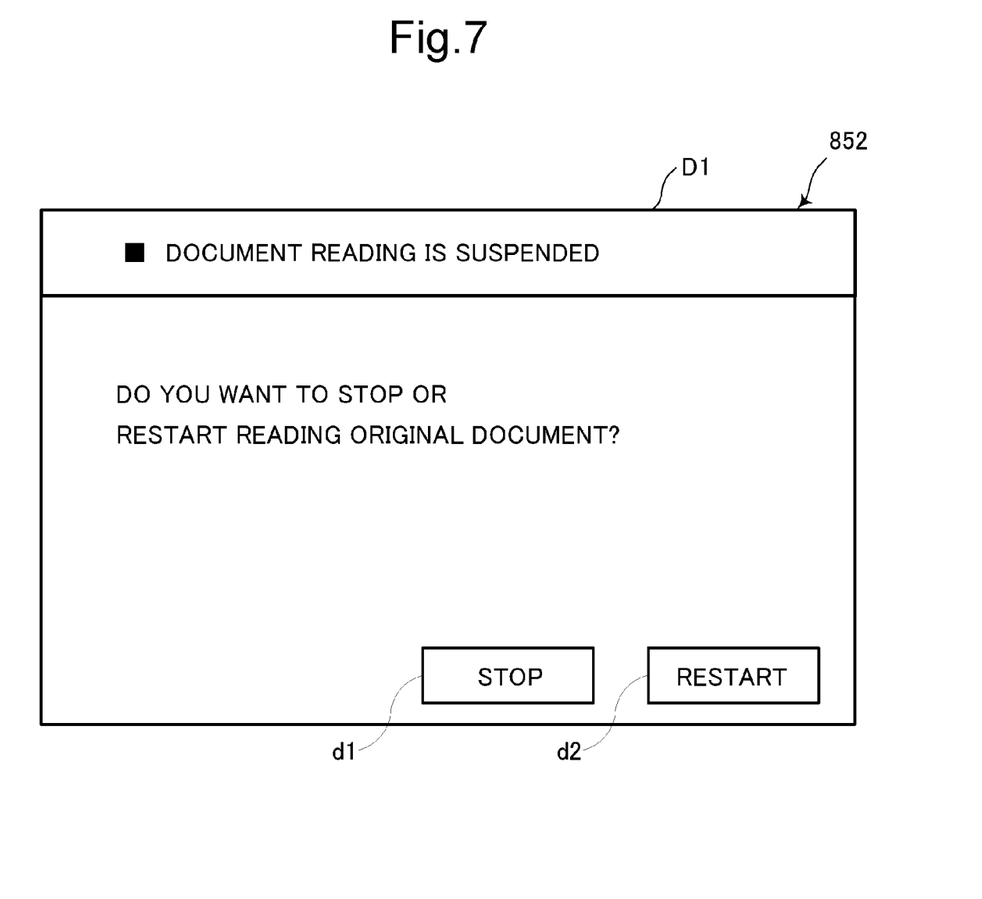
FIG. 7 is a view showing an example of an acceptance screen displayed on a display section of the image forming apparatus according to Modification 1 of the present disclosure.

After the execution of the alert processing in step S13, the display control section 105 allows the display section 852 to display a predetermined acceptance screen (step S20). FIG. 7 is a view showing an example of an acceptance screen D1 displayed on the display section 852. The acceptance screen D1 is a screen through which a user's instruction to stop or restart reading an original document is accepted.

When the user performs an operation of selecting a button d1 provided in the acceptance screen D1, the acceptance section 104 accepts an instruction to stop reading an original document (YES in step S21). In this case, the operation control section 102 stops the image reading processing that was supposed to be performed based on the image reading instruction accepted in step S10 (step S22).

On the other hand, when the user performs an operation of selecting a button d2 provided in the acceptance screen D1, the acceptance section 104 accepts an instruction to restart reading an original document (NO in step S21). In this case, the operation control section 102 restarts the image reading processing (step S14).

As just described, when knowing, from an alert, that there is dirt, such as dust, on the first original glass plate 321 for use in reading an original document being conveyed, the user can select to stop or restart reading the original document.

In the case where the alert processing is performed during a sheet interval from when the reading section 30 completes the operation of reading one original document to when it starts the operation of reading the next original document, the operation control section 102 performs the processing in the above-described step S20 and later steps after it allows the reading section 30 to suspend reading the next original document.

<Modification 2>

The acceptance section 104 may accept settings about colors of light to be emitted from the light-emitting part 41 when the foreign matter detecting section 103 detects a foreign matter on the first original glass plate 321. Furthermore, the acceptance section 104 may accept a setting about the timing with which the above alert processing is performed. Moreover, the acceptance section 104 may accept a setting about the sensitivity for detecting a foreign matter.

Figure 8:
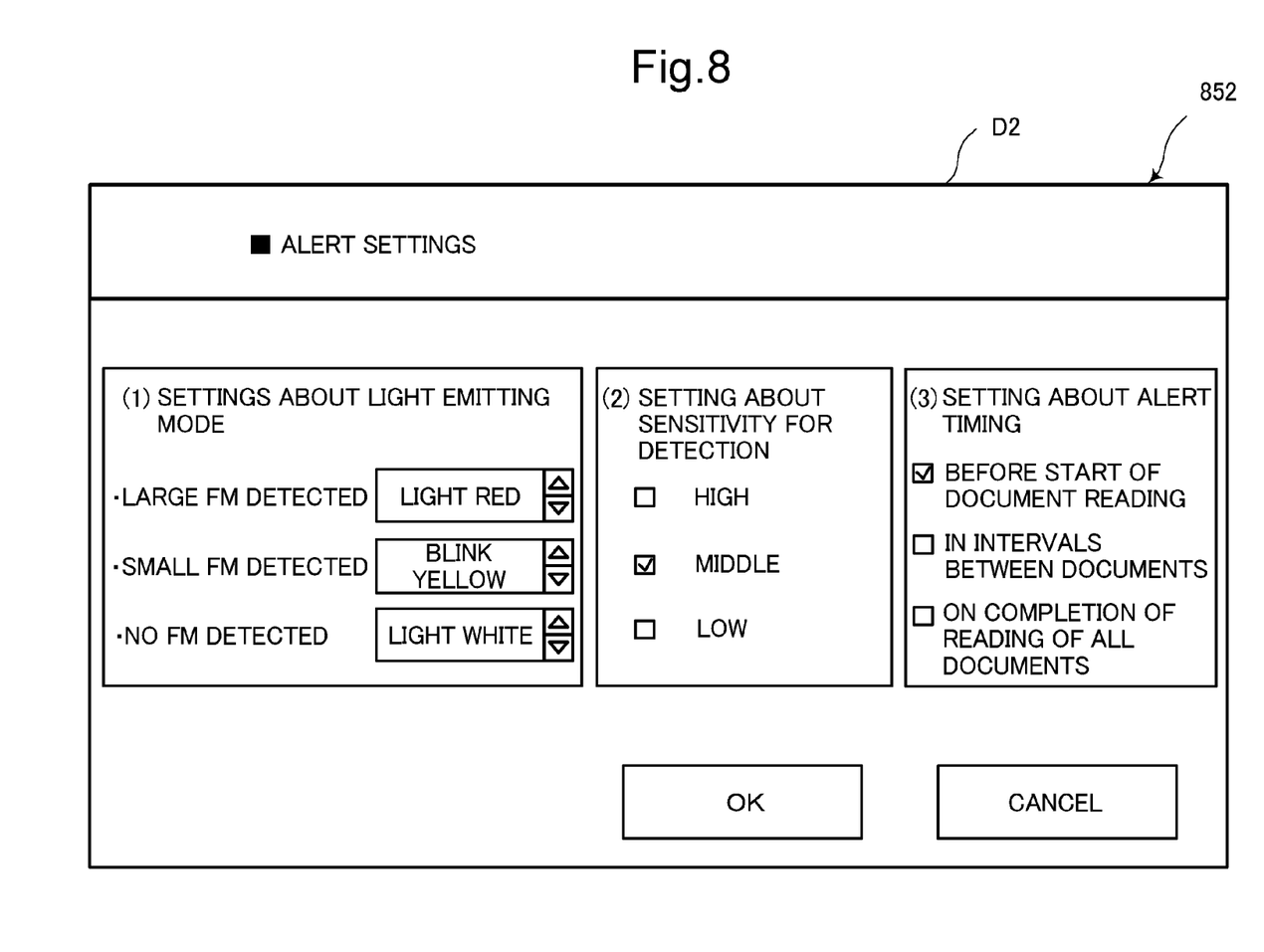
FIG. 8 is a view showing an example of a setting screen displayed on a display section of an image forming apparatus according to Modification 2 of the present disclosure.

FIG. 8 is a view showing an example of a setting screen D2 displayed on the display section 852 in Modification 2 of the present disclosure. In the example shown in FIG. 8, the user can select, as the settings about the light emitting mode, the light emitting mode when the foreign matter detecting section 103 has detected a large foreign matter, the light emitting mode when the foreign matter detecting section 103 has detected a small foreign matter, and the light emitting mode when the foreign matter detecting section 103 has detected no foreign matter. Furthermore, the user can select, as the setting about the sensitivity for detecting a foreign matter, a high, middle, or low level of sensitivity. Moreover, the user can select the timing with which the alert processing is performed from among before the start of reading of an original document, in the sheet intervals between original documents, and on completion of reading of all of a set of original documents.

The acceptance section 104 accepts each of the above settings based on an operation entered by the user according to the above setting screen D2. The acceptance section 104 allows the storage section 87 to store the accepted setting as setting data. For example, the acceptance section 104 allows the storage section 87 to store a threshold value (pixel value) corresponding to the sensitivity for detecting a foreign matter. The operation control section 102 allows the light-emitting part 41 to emit light in a light emitting mode indicated by the setting data stored in the storage section 87. Furthermore, the operation control section 102 performs the alert processing with a timing indicated by the setting data stored in the storage section 87. Moreover, the operation control section 102 performs the processing for detecting a foreign matter on the first original glass plate 321 using a threshold value indicated by the setting data stored in the storage section 87.

As just described, in the image forming apparatus 1 according to Modification 2, the user can make desired settings about the light emitting mode of the light-emitting part 41, the timing to perform the alert processing, and the sensitivity for detecting a foreign matter.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image reading device comprising:
   a housing forming an outer covering of the image reading device;
   a document conveyance section including a document loading chute and configured to convey an original document placed on the document loading chute;
   an original glass plate allowing the original document being conveyed from the document conveyance section to pass thereover;
   a reading unit including a light-emitting part and a light-receiving part, the light-emitting part including first light source, second light source, and third light source and configured to emit light toward the original document at a predetermined document reading position, the light-receiving part being configured to receive light reflected on the original document;
   an operation control section configured to control a light emitting operation of the light-emitting part; and
   a foreign matter detecting section configured to detect a foreign matter on the original glass plate,
   wherein the housing is provided with a hollow capable of letting part of the light emitted from the light-emitting part out of the image reading device, and
   the operation control section is further configured to, when the foreign matter detecting section detects the foreign matter on the original glass plate, allow the light-emitting part to emit light of a different color from the light emitted during reading of the original document.

2. The image reading device according to claim 1, wherein the operation control section is further configured to change the color of the light emitted from the light-emitting part depending on an amount of the foreign matter detected by the foreign matter detecting section.

3. The image reading device according to claim 2, wherein
   when the foreign matter detecting section detects the foreign matter, the operation control section allows the light-emitting part to light or blink, and
   the operation control section further allows the light-emitting part to light or blink differently depending on the amount of the foreign matter detected.

4. The image reading device according to claim 1, wherein when a plurality of the original documents are placed on the document loading chute and there are the plurality of the original documents to be read, the operation control section performs, during a sheet interval from an end of an operation of the reading unit for reading one of the original documents to a start of an operation of the reading unit for reading next one of the original documents, processing for allowing the light-emitting part to emit the light of the different color.

5. The image reading device according to claim 1, wherein the operation control section performs, during a period from acceptance of an instruction to read the original document to when the reading unit starts reading the original document, processing for allowing the light-emitting part to emit the light of the different color.

6. The image reading device according to claim 4, further comprising:
   a display section;
   a display control section configured to control a display operation of the display section; and
   an acceptance section configured to accept an instruction from a user,
   wherein when the foreign matter detecting section detects the foreign matter on the original glass plate, the operation control section allows the reading unit to suspend reading the original document and the display control section allows the display section to display an acceptance screen through which an instruction to stop or restart reading the original document is accepted from the user,
   when the acceptance section accepts the instruction to stop reading the original document, the operation control section allows the reading unit to stop reading the original document, and
   when the acceptance section accepts the instruction to restart reading the original document, the operation control section allows the reading unit to restart reading the original document.

7. The image reading device according to claim 1, wherein the operation control section performs, after the reading unit completes an operation of reading all the original documents placed on the document loading chute, processing for allowing the light-emitting part to emit the light of the different color.

8. The image reading device according to claim 1, further comprising an acceptance section configured to accept a setting about the color of the light to be emitted from the light-emitting part when the foreign matter detecting section detects the foreign matter on the original glass plate,
   wherein the operation control section is further configured to allow the light-emitting part to emit the light in the color indicated by the setting accepted by the acceptance section.

9. The image reading device according to claim 1, further comprising an acceptance section configured to accept a setting about a timing with which the operation control section performs processing for allowing the light-emitting part to emit the light of the different color,
   wherein the operation control section performs the processing for allowing the light-emitting part to emit the light of the different color with the timing indicated by the setting accepted by the acceptance section.

10. The image reading device according to claim 1, further comprising an acceptance section configured to accept a setting about a sensitivity of the foreign matter detecting section for detecting the foreign matter, wherein the foreign matter detecting section is further configured to perform processing for detecting the foreign matter on the original glass plate with the sensitivity indicated by the setting accepted by the acceptance section.

11. The image reading device according to claim 1, wherein a light guide capable of guiding the part of the light emitted from the light-emitting part out of the image reading device is provided in the hollow.

12. The image reading device according to claim 11, wherein an exit surface of the light guide through which light goes toward the outside of the image forming apparatus is embossed.

13. An image forming apparatus comprising an image reading device and an image forming section, the image reading device comprising:

a housing forming an outer covering of the image reading device;

a document conveyance section including a document loading chute and configured to convey an original document placed on the document loading chute;

an original glass plate allowing the original document being conveyed from the document conveyance section to pass thereover;

a reading unit including a light-emitting part and a light-receiving part, the light-emitting part including first light source, second light source, and third light source and configured to emit light toward the original document at a predetermined document reading position, the light-receiving part being configured to receive light reflected on the original document;

an operation control section configured to control a light emitting operation of the light-emitting part; and a foreign matter detecting section configured to detect a foreign matter on the original glass plate, wherein the housing is provided with a hollow capable of letting part of the light emitted from the light-emitting part out of the image reading device, and the operation control section is further configured to, when the foreign matter detecting section detects the foreign matter on the original glass plate, allow the light-emitting part to emit light of a different color from the light emitted during reading of the original document, and the image forming section is configured to form an image on a recording paper sheet based on image data read by the image reading device.

\* \* \* \* \*